US012081286B2

United States Patent
Agut et al.

(10) Patent No.: US 12,081,286 B2
(45) Date of Patent: Sep. 3, 2024

(54) SWITCH-MODE POWER SUPPLY OF A NFC TYPE READER

(71) Applicants: STMicroelectronics razvoj polprevodnikov d.o.o., Ljubljana (SI); STMicroelectronics France, Montrouge (FR)

(72) Inventors: Francois Agut, Saint Vital (FR); Severin Trochut, Gilly sur Isere (FR); Vinko Kunc, Ljubljana (SI)

(73) Assignees: STMICROELECTRONICS RAZVOJ POLPREVODNIKOV D.O.O., Ljubljana (SI); STMICROELECTRONICS FRANCE, Montrouge (FR)

( * ) Notice: Subject to any disclaimer, the term of this patent is extended or adjusted under 35 U.S.C. 154(b) by 425 days.

(21) Appl. No.: 16/587,419

(22) Filed: Sep. 30, 2019

(65) Prior Publication Data

US 2020/0112345 A1 Apr. 9, 2020

(30) Foreign Application Priority Data

Oct. 9, 2018 (FR) .................................... 1859339

(51) Int. Cl.
 *H04B 5/00* (2024.01)
 *G06K 19/07* (2006.01)
 *G08C 17/02* (2006.01)
 *H02M 3/335* (2006.01)
 *H04B 5/24* (2024.01)

(52) U.S. Cl.
 CPC ............ *H04B 5/24* (2024.01); *G06K 19/0725* (2013.01); *G08C 17/02* (2013.01); *H02M 3/33576* (2013.01)

(58) Field of Classification Search
 CPC .............. G06K 19/0725; G08C 17/02; H02M 1/0019; H02M 3/156; H02M 3/158; H02M 3/33576; H04B 5/0056; H04B 5/0075; H04B 5/0081; H04B 5/26; H04B 5/24; H04B 5/77; Y02B 70/10
 See application file for complete search history.

(56) References Cited

U.S. PATENT DOCUMENTS

| 5,148,144 | A | * | 9/1992 | Sutterlin | ................. H04L 25/02 340/310.17 |
| 5,430,366 | A | * | 7/1995 | Erckert | ............... H02M 3/1588 323/282 |
| 6,005,782 | A | * | 12/1999 | Jain | ......................... H02M 3/01 363/41 |

(Continued)

FOREIGN PATENT DOCUMENTS

| CN | 102209129 A | 10/2011 |
| CN | 103023314 A | 4/2013 |

(Continued)

*Primary Examiner* — Yong Hang Jiang
(74) *Attorney, Agent, or Firm* — Slater Matsil, LLP

(57) ABSTRACT

A reader is adapted to wirelessly exchanging information with a wireless apparatus. The reader includes a signal generator configured to generate a modulation signal. An emitter/receptor stage is configured to be driven by the modulation signal. A switched-mode power supply is configured to power the emitter/receptor stage. The switched-mode power supply includes a power switch controlled in function of the modulation signal.

22 Claims, 3 Drawing Sheets

(56) References Cited

U.S. PATENT DOCUMENTS

| | | | | |
|---|---|---|---|---|
| 6,012,736 A * | 1/2000 | Hansen | ............ | B60R 21/01 340/436 |
| 6,469,478 B1 * | 10/2002 | Curtin | ............ | H02M 3/156 323/266 |
| 7,173,403 B1 * | 2/2007 | Chen | ............ | H02M 3/157 323/282 |
| 7,450,360 B2 * | 11/2008 | Schopfer | ............ | H02M 1/32 323/283 |
| 9,020,071 B1 * | 4/2015 | Chan | ............ | H04L 27/04 375/300 |
| 9,760,101 B2 * | 9/2017 | Fujiwara | ............ | H02M 1/08 |
| 2003/0007376 A1 * | 1/2003 | Brkovic | ............ | H02M 3/3376 363/98 |
| 2004/0004404 A1 * | 1/2004 | Eckardt | ............ | H03K 17/687 307/140 |
| 2004/0104799 A1 | 6/2004 | Haisch | | |
| 2008/0272889 A1 * | 11/2008 | Symons | ............ | H02J 7/025 340/10.1 |
| 2009/0261659 A1 * | 10/2009 | Carrick | ............ | G06K 7/0008 307/82 |
| 2012/0092900 A1 * | 4/2012 | Orr | ............ | H02M 7/217 363/21.03 |
| 2013/0002045 A1 * | 1/2013 | Hassan-Ali | ............ | H02M 3/07 307/130 |
| 2013/0003422 A1 * | 1/2013 | Persson | ............ | H02M 3/33507 363/21.01 |
| 2014/0092648 A1 * | 4/2014 | Tang | ............ | H02M 3/33515 363/21.17 |
| 2014/0098579 A1 * | 4/2014 | Kleinpenning | ... | H02M 3/33523 363/21.17 |
| 2014/0268900 A1 * | 9/2014 | Hu | ............ | H02M 3/158 363/18 |
| 2015/0124494 A1 * | 5/2015 | Malinin | ............ | H02M 3/33592 363/21.14 |
| 2016/0021712 A1 * | 1/2016 | Nakamura | ............ | B60Q 1/1415 315/291 |
| 2019/0190391 A1 * | 6/2019 | Takahashi | ............ | H02M 3/33507 |

FOREIGN PATENT DOCUMENTS

| | | |
|---|---|---|
| CN | 105205513 A | 12/2015 |
| CN | 106022420 A | 10/2016 |
| CN | 107681900 A | 2/2018 |
| DE | 102014102936 A1 | 9/2015 |
| EP | 1385251 A1 | 1/2004 |
| GB | 2438257 A | 11/2007 |

* cited by examiner

SWITCH-MODE POWER SUPPLY OF A NFC TYPE READER

CROSS-REFERENCE TO RELATED APPLICATIONS

This application claims priority to French Patent Application No. 1859339, filed on Oct. 9, 2018, which application is hereby incorporated herein by reference.

TECHNICAL FIELD

Embodiments of the invention relate to switched-mode power supplies for NFC systems.

BACKGROUND

Near field communication (NFC) is a set of standards for wireless apparatuses, in particular smartphones and similar devices, utilized to establish radio communication between two devices by touching them together or bringing them into proximity, typically at a distance of 10 cm or less.

NFC uses electromagnetic induction between two loop antennas located within each other's near field, effectively forming an air-core transformer. It operates for example at 13.56 MHz. NFC involves an initiator and a target. The initiator or reader actively generates an RF field that can power a passive target, an unpowered chip called a transponder or "tag." This enables NFC targets to take simple form factors as stickers, key fobs, or cards that do not use batteries.

The communication from the reader to the tag is performed by amplitude modulation of a carrier signal by the reader, respecting some standards.

The wireless device or receiver which receives the electromagnetic field generated by the reader may be passive (tag) or active. In the first case, the tag does not generate electromagnetic field, whereas in the second case the receiver generates also an electromagnetic field, and the communication between the reader and the receiver uses an Active Load Modulation (ALM).

NFC technology is standardized in ISO/IEC 18 092, ISO/IEC 21 481 and NFC FORUM documents but incorporates a variety of pre-existing standards including type A protocol and type B protocol which are standardized in ISO/IEC 14 443.

Type A protocol, also known as ISO 14443A and NFC-A technology, is based on On Off Keying (OOK) modulation using modified Miller pulse position.

In general, a switched-mode power supply used in a NFC reader is coupled to the emitter/receptor stage (load) of the reader. The emitter/receptor stage is the load of the switched-mode power supply.

The switched-mode power supply is designed for a conversion from an unregulated input voltage to a regulated output voltage applied to the load. The switched-mode power supply includes generally a reference voltage to regulate the output voltage.

When such a load coupled to the switched-mode power supply varies in a sudden and quick way during emission and/or reception of information, the output voltage of such a switched-mode power supply cannot be regulated in an adapted rapid way, which generally results in overshoots or undershoots, commonly known to those skilled in the art, on the output voltage. The overshoots or undershoots during extreme load transient could induce failures of the switched-mode power supply in the voltage domain.

There is a need to provide a low-complexity and low-consumption technical solution that makes it possible to ensure power regulation of a switched-mode power supply adapted to the load variation.

SUMMARY

Embodiments of the invention relate to switched-mode power supplies, commonly known to those skilled in the art under the acronym SMPS. Particular embodiments relate to switched-mode power supplies applicable in radio frequency systems such as near field communication systems, commonly known to those skilled in the art under the acronym NFC systems. For example, embodiments relate to the power regulation of switched-mode power supplies adapted for modulation used in NFC systems.

According to one aspect, a reader is proposed, which is adapted to wirelessly exchanging information with a wireless apparatus. Such a wireless apparatus may be a passive transponder or an active transponder using active load modulation. The reader may be actually a reader or a smartphone emulated in reader mode.

In one embodiment, the reader comprises a signal generator configured to generate a modulation signal. An emitter/receptor stage is configured to be driven by the modulation signal. A switched-mode power supply is configured to power the emitter/receptor stage. The switched-mode power supply comprises a power switch controlled in function of the modulation signal.

Advantageously, such a switched-mode power supply can control the power switch of the switched-mode power supply by simply using the modulation signal representative of the variation of the load, in others words the emitter/receptor stage, coupled to the switched-mode power supply.

In this way, the regulated output voltage of the switched-mode power supply follows the variation of the load and the possible overshoots or undershoots during extreme load transient can be reduced.

According to one embodiment, the modulation signal is an on-off key (OOK) modulation signal having a first state and a second state, and the power switch is in the open state when the modulation signal is in the first state.

According to another embodiment, the switched-mode power supply comprises an inductor coupled to the power switch and a rectifier switch coupled to the inductor and controlled in function of the modulation signal.

The current of the inductor is almost null when the power switch is in the open state due to the modulation signal, which allows advantageously decreasing not only overshoots or undershoots during load transient but also the power consumption of the switched-mode power supply.

The use of such a rectifier switch can advantageously increase the efficiency of the switched-mode power supply.

The rectifier switch can for example be in the off state when the modulation signal is in the first state.

As a non-limiting example, the first state can be an off state.

The switched-mode power supply can for example be a DC-DC converter.

According to yet another embodiment, the reader is a near field communication reader.

According to another aspect, an electronic device, such as a mobile cellular phone, is proposed comprising a reader as defined above.

According to yet another aspect, a switched-mode power supply belonging to a reader as defined above, is proposed having a control input configured to receive the modulation signal.

BRIEF DESCRIPTION OF THE DRAWINGS

Other advantages and features of the invention will become apparent on examining the detailed description of wholly non-limiting modes of implementation and embodiments and the appended drawings, in which.

DETAILED DESCRIPTION OF ILLUSTRATIVE EMBODIMENTS

Figure 1:
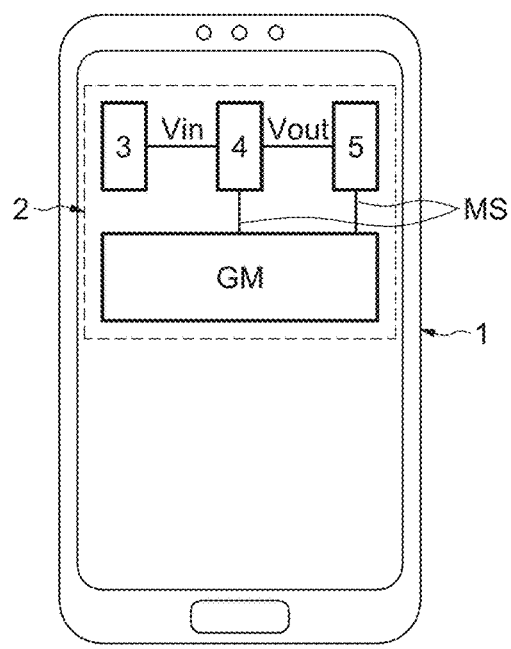
FIGS. 1 to 4 schematically illustrate embodiments of the invention.

The reference 1 of the FIG. 1 designates an electronic device, here for example an intelligent mobile cellular telephone, commonly known to those skilled in the art as smartphone, comprising a radio frequency communication reader 2, here for example a near field communication reader, commonly known to those skilled in the art under the acronym NFC reader, configured to establish communication with other near field communication devices, for example a NFC tag.

The NFC reader 2 comprise a power source, here for example a direct current DC power source 3, a switched-mode power supply, here for example a DC-DC converter 4, coupled to the power source 3, an emitter/receptor stage 5 coupled to the switched-mode power supply 4, and a signal generator GM configured to deliver a modulation signal MS to the switched-mode power supply 4 and the emitter/receptor stage 5.

The switched-mode power supply 4 is configured to convert an input voltage Vin received from the power source 3 to an output voltage Vout to be delivered to the emitter/receptor stage 5.

The emitter/receptor stage 5 is powered by the output voltage Vout of the switched-mode power supply 4 and intended to receive the modulation signal MS from the signal generator GM.

For example, the modulation signal MS is an on-off keying, commonly known to skilled in the art under the acronym OOK, modulated signal, or in others words, a 100% amplitude shift keying, commonly known to skilled in the art under the acronym ASK, modulated signal.

Figure 2:
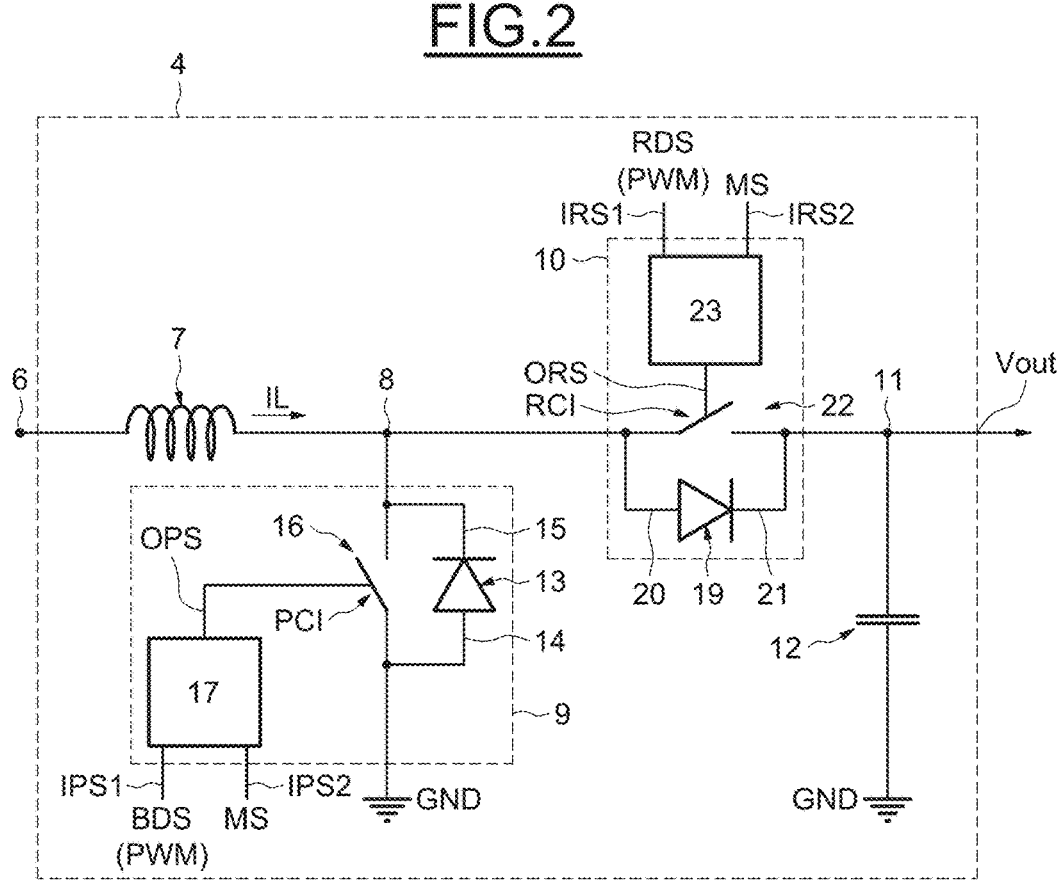
Figure 3:
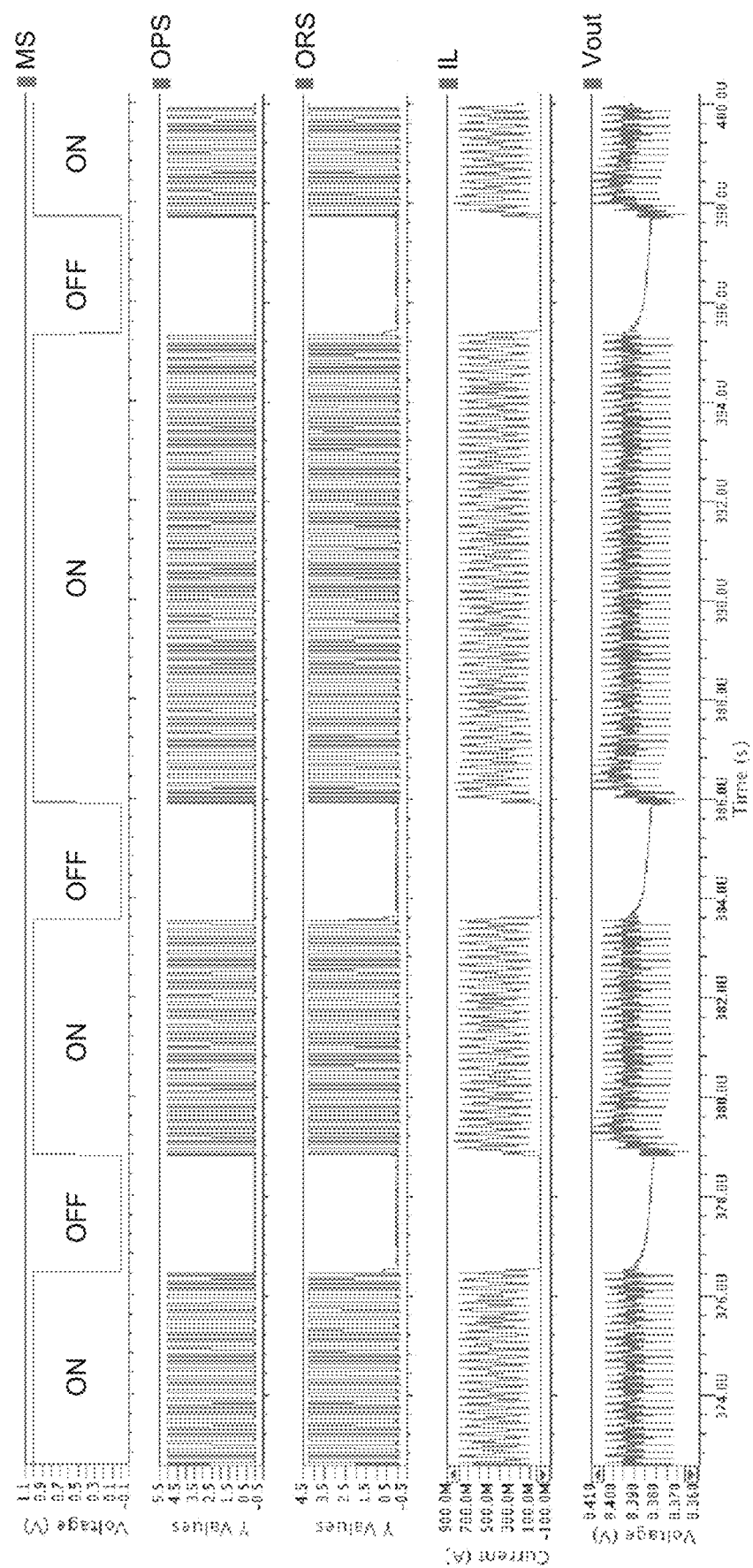

We now refer to the FIG. 2 to illustrate a simplified embodiment example of the switched-mode power supply 4 and to the FIG. 3 to illustrate corresponding simulation results of the embodiment example illustrated in the FIG. 2.

The switched-mode power supply 4 illustrated in this example is for example a boost DC-DC converter comprising an input pin 6 coupled to the power source 3, an inductor 7 coupled between the input pin 6 and a middle node 8, a power switch stage 9 coupled between the middle node 8 and the ground GND, a rectifier switch stage 10 coupled between the middle node 8 and an output pin 11, and an output capacitor 12 coupled between the output pin 11 and the ground GND.

The power switch stage 9 comprises a first diode 13 of which the anode 14 is coupled to the ground and the cathode 15 is coupled to the middle node 8, and a power switch 16 coupled in parallel with the first diode 13 and having a power control input PCI coupled to a power switch control block 17.

The power switch 16 can comprise an N-type MOSFET.

The power switch control block 17 comprises a first input IPS1 intended to receive a boost driver signal BDS, which is generally a pulse-width-modulated signal, commonly known to those skilled in the art under the acronym PWM signal. The power switch control block 17 also comprises a second input IPS2 intended to receive the modulation signal MS, and an output OPS coupled to the power control input PCI of the power switch 16.

The power switch control block 17 can be for example a simple AND gate if the power switch 16 is a NMOS switch.

As illustrated in the FIG. 3, the modulation signal MS has an "on" state and an "off" state. The frequency of the modulation signal MS can for example be chosen in a range between 106 kb/s and 848 kb/s and a modified Miller encoding can for example be applied.

When the modulation signal MS is in the "off" state, the power switch 16 is in its "open" state since the output OPS of the power switch control block 17 is also in the "off" state.

In others words, the DC-DC converter 4 has its power switch 16 in its "off" state and the output voltage of the DC-DC converter 4 is almost stable during a period where the modulation signal MS is in the "off" state, as the current IL generated by the inductor 7 is quickly decreasing to an almost null value and the load 5 of the switched-mode power supply 4 is not consuming current.

As we can observe in the FIG. 3, the current IL of inductor 7 of the DC-DC converter 4 is almost null and the output voltage Vout of the DC-DC converter is almost stable at least during the period where the modulation signal MS is in the "off" state.

Furthermore, the power consumption of the DC-DC converter 4 is also advantageously reduced.

When the modulation signal MS is in the "on" state, the output of the power switch control block 17 is equal to the boost driver signal BDS.

The rectifier switch stage 10 comprises a second diode 19 of which the anode 20 is coupled to the middle node 8 and the cathode 21 is coupled to the output pin 11 and a rectifier switch 22 coupled in parallel with the second diode 19 and having a rectifier control input RCI coupled to a rectifier switch control block 23.

The rectifier switch 22 can comprise an N-type MOSFET.

The rectifier switch control block 23 comprises a first input IRS1 intended to receive a rectifier driver signal RDS, which is generally a PWM signal, a second input IRS2 intended to receive the modulation signal MS, and an output ORS coupled to the rectifier control input RCI of the rectifier switch 22.

The rectifier switch control block 23 can be for example a simple AND gate if the rectifier switch 22 is a NMOS switch.

When the modulation signal MS is in the "off" state, the rectifier switch 22 is in its "open" state since the output ORS of the rectifier switch control block 23 is also in the "off" state. As mentioned, the power switch 16 is also in the "open" state when the modulation signal MS is in the "off" state, which corresponds to the "off" state of the boost DC-DC converter.

When the modulation signal MS is in the "on" state, the output ORS of the rectifier switch control block 23 is equal to the rectifier driver signal RDS.

In this way, the rectifier switch 22 is directly controlled by the rectifier driver signal RDS, increasing thus the efficiency of DC-DC converter 4.

Furthermore, as we can observe in the FIG. 3, there is few variation of the output voltage Vout in the output pin 11 of the DC-DC converter 4 during the load transient of the NFC system 2 since the DC-DC converter 4 has its power switch 16 and rectifier switch 22 in the "off" state when the modulation signal MS is in its "off" state.

Figure 4:
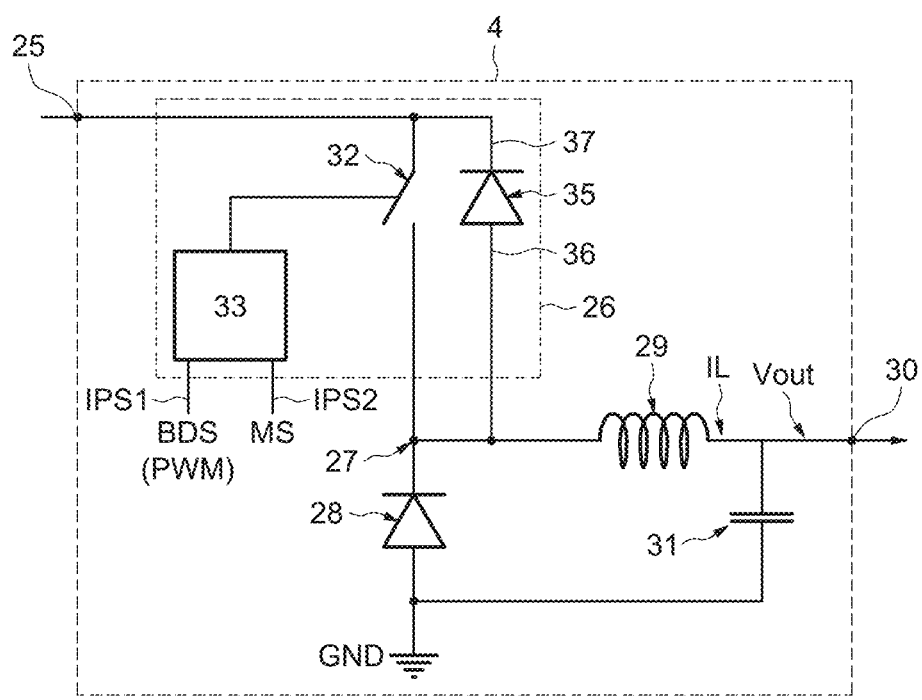

Alternatively, we refer to the FIG. 4 to illustrate another simplified embodiment example of the switched-mode power supply 4.

The switched-mode power supply 4 illustrated in this example is for example a buck DC-DC converter comprising an input pin 25 coupled to the power source 3, a power switch stage 26 coupled between the input pin 25 and a middle node 27, a first diode 28 of which the cathode is coupled between the middle node 27 and the anode is coupled the ground GND, an inductor 29 coupled between the middle node 27 and an output pin 30, and an output capacitor 31 coupled between the output pin 3o and the ground.

The power switch stage 26 comprises a second diode 35 of which the anode 36 is coupled to the middle node 27 and the cathode 37 is coupled to the input pin 25. A power switch 32 is controlled by a power switch control block 33 comprising a first input IPS1 intended to receive the driver signal BDS (PWM signal), a second input IPS2 intended to receive the modulation signal MS, and an output coupled to the power switch 32.

The power switch 32 can comprise an N-type MOSFET.

The power switch control block 33 can be for example a simple AND gate if the power switch 32 is a NMOS switch.

When the modulation signal MS is in the "off" state, the power switch 32 is in its "open" state since the output of the power switch control block 33 is also in the "off" state.

The current IL of the inductor 29 of the DC-DC converter in the "off" state is almost null and the output voltage Vout of the DC-DC converter 4 is almost stable at least during the period where the modulation signal MS is in the "off" state. Advantageously, the power consumption of the DC-DC converter 4 is also reduced.

When the modulation signal MS is in the "on" state, the output of the power switch control block 33 is equal to the boost driver signal BDS.

Furthermore, in the same way as illustrated in the FIG. 2, a rectifier switch, controlled by a rectifier switch control block, can also be coupled in parallel with the first diode 28 so as to form a rectifier switch stage increasing the efficiency of the buck DC-DC converter.

Thus, whatever the disclosed embodiment, the power regulation of the switched-mode power supply 4 is adapted to the load variation of the NFC reader 2 and the possible overshoots or undershoots during load transient are also reduced.

What is claimed is:

1. A reader adapted to wirelessly exchanging information with a wireless apparatus, the reader comprising:
   a signal generator configured to generate a modulation signal having a first state and a second state;
   an emitter/receptor stage, wherein the modulation signal is representative of a variation of a load of the emitter/receptor stage; and
   a switched-mode power supply configured to power the emitter/receptor stage, the switched-mode power supply comprising:
      an input node configured to be coupled to a power source;
      an inductor coupled between the input node and an intermediate node of the switched-mode power supply;
      a power switch circuit between the intermediate node and a reference voltage node of the switched-mode power supply, the power switch circuit comprising a first switch and a first control circuit, wherein a first input terminal of the first control circuit is configured to be coupled to a first pulse-width-modulated (PWM) signal, a second input terminal of the first control circuit is configured to be coupled to the modulation signal, and a first output terminal of the first control circuit is coupled to a control terminal of the first switch, wherein the first control circuit is configured to generate, at the first output terminal, a first switching control signal by gating the first PWM signal with the modulation signal, wherein the first switch is configured to be switched on and off by the first switching control signal; and
      a rectifier switch circuit between the intermediate node and an output node of the switched-mode power supply, the rectifier switch circuit comprising a second switch and a second control circuit, wherein a first input terminal of the second control circuit is configured to be coupled to a second PWM signal, a second input terminal of the second control circuit is configured to be coupled to the modulation signal, and a second output terminal of the second control circuit is coupled to a control terminal of the second switch, wherein the second control circuit is configured to generate, at the second output terminal, a second switching control signal by gating the second PWM signal with the modulation signal, wherein the second switch is configured to be switched on and off by the second switching control signal, wherein the second switch is configured to stay in an open state when the modulation signal is in the first state, wherein the second switch is configured to be switched on and off alternately when the modulation signal is in the second state.

2. The reader according to claim 1, wherein the modulation signal is an on-off key modulation signal having the first state and the second state.

3. The reader according to claim 1, wherein the switched-mode power supply is a boost DC-DC converter.

4. The reader according to claim 1, wherein the reader is a near field communication reader.

5. A switched-mode power supply comprising:
   an input node configured to be coupled to a power source;
   an inductor coupled between the input node and an intermediate node;
   a power switch stage coupled between the intermediate node and a reference voltage node, the power switch stage comprising a first diode arranged in parallel with a first switch;
   a rectifier switch stage coupled between the intermediate node and an output node, the rectifier switch stage comprising a second diode arranged in parallel with a second switch;
   an output capacitor coupled between the output node and the reference voltage node;
   a power switch control circuit having an output coupled to a control terminal of the first switch, the power switch control circuit having a first input configured to receive a modulation signal and a second input configured to receive a first pulse-width-modulated (PWM) signal, wherein the power switch control circuit is configured to generate a first switching control signal at the output of the power switch control circuit by gating the first PWM signal with the modulation signal; and a rectifier switch control block having a first input configured to receive a second PWM signal different from the first PWM signal, a second input configured to receive the modulation signal, and an output coupled to a control terminal of the second switch, wherein the rectifier switch control block is configured to generate a second switching control signal at the output of the rectifier switch control block by gating the second PWM signal with the modulation signal.

6. The switched-mode power supply according to claim 5, wherein the switched-mode power supply is a boost DC-DC converter.

7. The switched-mode power supply according to claim 5, wherein the first switch comprises an N-type MOSFET, wherein the first diode is coupled between a source terminal and a drain terminal of the N-type MOSFET.

8. The switched-mode power supply according to claim 5, wherein the first diode having an anode coupled to the reference voltage node and a cathode coupled to the intermediate node.

9. The switched-mode power supply according to claim 5, wherein the rectifier switch stage comprises:
the second diode having an anode coupled to the intermediate node and a cathode coupled to the output node; and
the second switch coupled in parallel with the second diode.

10. A switched-mode power supply comprising:
an input node configured to be coupled to a power source;
a power switch coupled between the input node and an intermediate node, wherein the power switch is configured to be switched on and off alternately by a switching control signal;
a first diode coupled between the intermediate node and a reference voltage node, the first diode having a cathode coupled to the intermediate node and having an anode coupled to the reference voltage node;
an inductor coupled between the intermediate node and an output node;
an output capacitor coupled between the output node and the reference voltage node; and
an AND gate having an output terminal coupled to a control terminal of the power switch, wherein a first input terminal of the AND gate is coupled to receive a modulation signal and a second input terminal of the AND gate is coupled to receive a pulse-width-modulated (PWM) signal, wherein the switching control signal of the power switch is the PWM signal when the modulation signal has a logic high value.

11. The switched-mode power supply according to claim 10, further comprising:
a second diode coupled in parallel with the power switch, the second diode having an anode coupled to the intermediate node and having a cathode coupled to the input node.

12. The switched-mode power supply according to claim 11, wherein the power switch comprises an N-type MOSFET, wherein a gate terminal of the N-type MOSFET is coupled to the output terminal of the AND gate, wherein a first one of a source terminal and a drain terminal of the N-type MOSFET is coupled to the input node, and a second one of the source terminal and the drain terminal of the N-type MOSFET is coupled to the intermediate node.

13. The switched-mode power supply according to claim 10, wherein the switched-mode power supply is a buck DC-DC converter.

14. The switched-mode power supply according to claim 10, wherein the reference voltage node is configured to be connected to electrical ground.

15. The reader according to claim 2, wherein the first switch is configured to stay in an open state when the modulation signal is in the first state, wherein the first switch is configured to be switched on and off alternately when the modulation signal is in the second state.

16. The reader according to claim 2, wherein the first PWM signal and the second PWM signal switch values at a higher frequency than the modulation signal.

17. The switched-mode power supply according to claim 5, wherein the first switch of the power switch stage is configured to stay open when the modulation signal is in a first state, and is configured to be turned on and off alternately by the first PWM signal when the modulation signal is in a second state.

18. The switched-mode power supply according to claim 17, wherein the second switch of the rectifier switch stage is configured to stay open when the modulation signal is in the first state, and is configured to be turned on and off alternately by the second PWM signal when the modulation signal is in the second state.

19. The reader according to claim 16, wherein the first PWM signal is an inverse of the second PWM signal.

20. The reader according to claim 15, wherein the first control circuit and the second control circuit are AND gates.

21. The switched-mode power supply according to claim 6, wherein the power switch control circuit and the rectifier switch control block are AND gates.

22. The switched-mode power supply according to claim 18, wherein the first PWM signal and the second PWM signal switch values at a first frequency, wherein the modulation signal switches between the first state and the second state at a second frequency lower than the first frequency.

* * * * *